(12) United States Patent
Ginzburg

(10) Patent No.: US 8,451,281 B2  
(45) Date of Patent: May 28, 2013

(54) SHARED VIRTUAL MEMORY BETWEEN A HOST AND DISCRETE GRAPHICS DEVICE IN A COMPUTING SYSTEM

(75) Inventor: Boris Ginzburg, Haifa (IL)

(73) Assignee: Intel Corporation, Santa Clara, CA (US)

(*) Notice: Subject to any disclaimer, the term of this patent is extended or adjusted under 35 U.S.C. 154(b) by 1009 days.

(21) Appl. No.: 12/489,954

(22) Filed: Jun. 23, 2009

(65) Prior Publication Data

US 2010/0321397 A1 Dec. 23, 2010

(51) Int. Cl.
*G06F 15/167* (2006.01)
*G06F 15/16* (2006.01)

(52) U.S. Cl.
USPC .......................................... 345/541; 345/503

(58) Field of Classification Search
USPC ............... 345/501, 503, 530, 537, 541
See application file for complete search history.

(56) References Cited

U.S. PATENT DOCUMENTS 7,623,134 B1*  11/2009  Danilak ................. 345/568
2010/0118041 A1*  5/2010  Chen et al. ............. 345/542

OTHER PUBLICATIONS

Perry H. Wang, et al., "EXOCHI: Architecture and Programming Environment for a Heterogeneous Multi-core Multithreaded System," Jun. 11-13, 2007, pp. 156-166.

* cited by examiner

*Primary Examiner* — Jacinta M Crawford
(74) *Attorney, Agent, or Firm* — Trop, Pruner & Hu, P.C.

(57) ABSTRACT

In one embodiment, the present invention includes a device that has a device processor and a device memory. The device can couple to a host with a host processor and host memory. Both of the memories can have page tables to map virtual addresses to physical addresses of the corresponding memory, and the two memories may appear to a user-level application as a single virtual memory space. Other embodiments are described and claimed.

19 Claims, 5 Drawing Sheets

SHARED VIRTUAL MEMORY BETWEEN A HOST AND DISCRETE GRAPHICS DEVICE IN A COMPUTING SYSTEM

BACKGROUND

Many computer systems include a general-purpose processor such as a microprocessor, and additional devices such as components that may be configured into a system or later added in. For example, one such device can provide for graphics functionality that may be implemented by way of an add-in device that typically includes a graphics processing unit (GPU) and a separate memory on an add-in card.

Conventionally, a central processing unit (CPU)/GPU system model can be described as two independent computing complexes connected by an interconnect. The corresponding GPU programming model considers the host (i.e., CPU) and device (i.e., GPU) memory subsystems as two isolated "islands": code which runs on host (CPU) cannot directly access data located in graphics memory, and code which runs on the graphics device (GPU) cannot access data located in the host memory. Therefore, a programmer must explicitly copy data from host to device and back. As a result, host code and device code cannot exchange general data structures (e.g., lists, trees, etc.) that use pointers. Instead, the current GPU model is limited to data arrays only, so a programmer must use index (offset) instead of pointers, which is inefficient.

Another problem with current graphics cards is that they do not support virtual paging mechanisms. Such virtual paging enables the translation of so-called virtual addresses (VAs) to physical addresses (PAs) of the physical memory. Using virtual paging mechanisms, software is not limited to the actual physical memory, and instead can make reference to a larger virtual address space. Typically, an address translation mechanism such as a translation lookaside buffer (TLB) provides for storage of VA to PA translations. A lack of a virtual paging mechanism in conventional graphics units makes existing GPU programming extremely sensitive to the size of physical memory located on the graphics card.

DETAILED DESCRIPTION

In various embodiments, an Asymmetric Shared Virtual Memory (A-SVM) model may be provided for host and peripheral device arrangements such as a CPU/GPU system, in which memory on the device serves as a so-called "mega-cache" for memory on the host. That is, rather than a typically limited cache that operates using information units of a small size (e.g., cache line, which may be 64, 128 or other amount of bytes), embodiments may use a device memory as a page-level cache structure such that entire memory pages may be efficiently stored in the device memory to enable local access by the device. While the scope of the present invention is not limited in this regard, embodiments may be applicable to 4 kilobytes (KB) page sizes. Thus, the swapping of memory between CPU and GPU is dynamic with a page size unit for swapping. Coherency of memory between CPU and GPU may be based on a modification to conventional operating system (OS) mechanisms for page protection. Still further, embodiments may provide support for virtual paging with host memory serving as a "swap file" for graphics memory.

Figure 1:
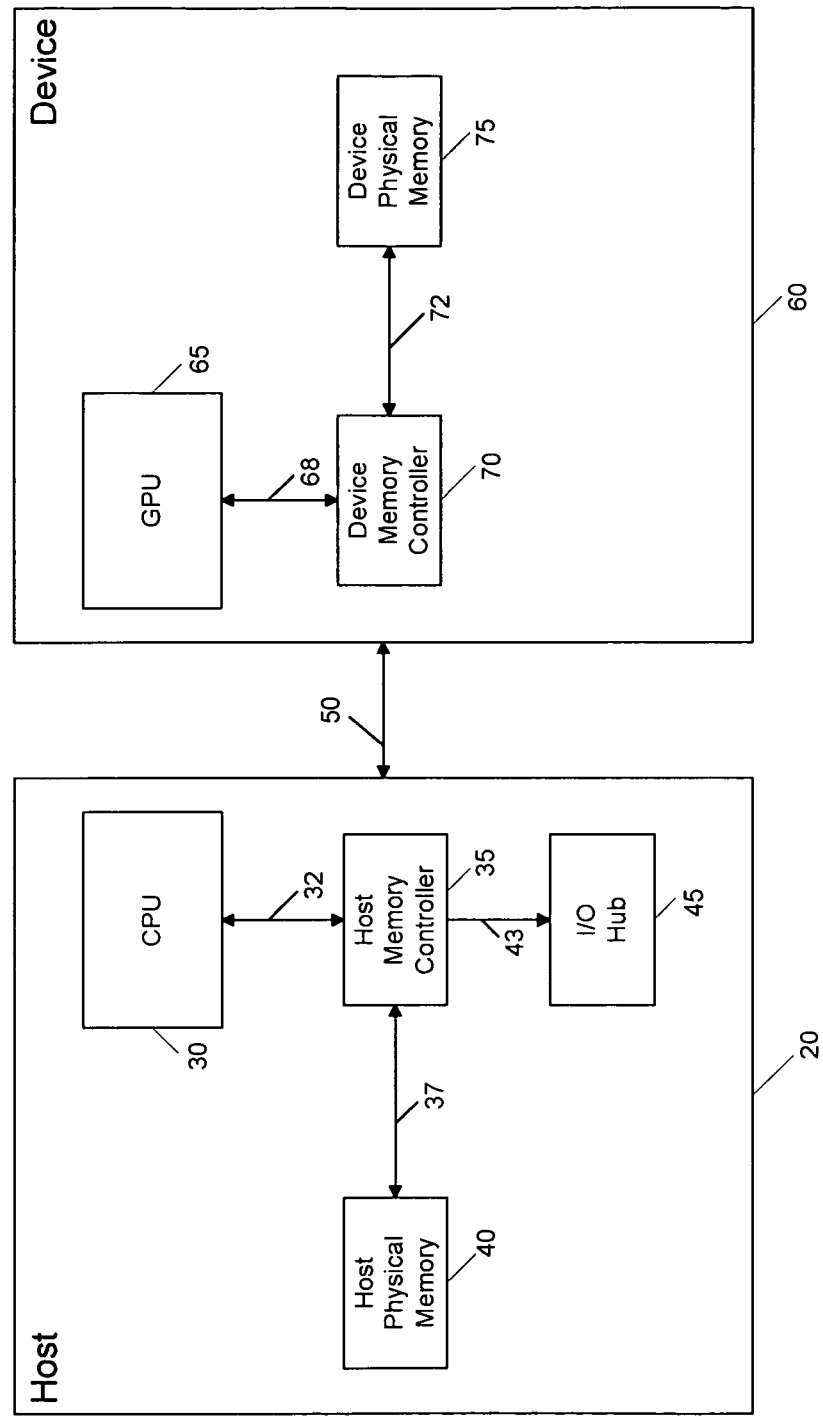
FIG. 1 is a block diagram illustrating a host and device in accordance with one embodiment of the present invention.

Referring now to FIG. 1, shown is a block diagram illustrating a CPU/GPU in accordance with one embodiment of the present invention. As shown in FIG. 1, a system 10 may include a host portion 20 and a device portion 60 which may include certain functionality. In the embodiment described herein, the device may provide graphics functionality but other devices such as another media processor, network processor or other function can be provided. In one embodiment, host portion 20 may be implemented by way of a collection of semiconductor devices coupled to a motherboard. However, other implementations such as a single system-on-chip (SoC) may be present. Host portion 20 includes a CPU 30 that may be coupled via an interconnect 32 to a host memory controller 35. While shown as separate components, in various implementations the memory controller may be integrated within CPU 30. In turn, host memory controller 35 may be coupled to a host physical memory 40 (which in one embodiment may be dynamic random access memory (DRAM)) via an interconnect 37 which may be a memory interconnect such as a double data rate (DDR) interconnect. Still further, memory controller 35 may be coupled via another interconnect 43 such as a Peripheral Component Interconnect Express (PCI Express™ (PCIe™)) interconnect to an input/output (IO) hub 45, which may provide connection to one or more peripheral devices coupled to host portion 20.

Still referring to FIG. 1, it is seen that host portion 20 may be coupled to device portion 60 via an interconnect 50 such as a PCIe™ interconnect. However, understand that in certain implementations both host and device portions may be present on a single circuit board. In yet other implementations, both portions may be realized as a single integrated circuit in which both portions are configured.

As seen in FIG. 1, device portion 60 includes a GPU 65 which may be a separate dedicated graphics processing unit which may be coupled via an interconnect 68 to a device memory controller 70 that in turn may be coupled via an interconnect 72 to a device physical memory 75, which also may be DRAM in some embodiments. In one implementation, interconnect 72 may be a graphics double data rate (GDDR) interconnect. While device memory 75 may typically be smaller than that of host memory 40, in some embodiments it is possible for the two memories to be of similar size. Furthermore, understand that given the large size of device memory 75 (as compared to a conventional cache) this memory can act as mega-cache to handle page-sized transfers from host memory 40. While shown with this particular implementation in the embodiment of FIG. 1, the scope of the present invention is not limited in this regard.

Figure 2:
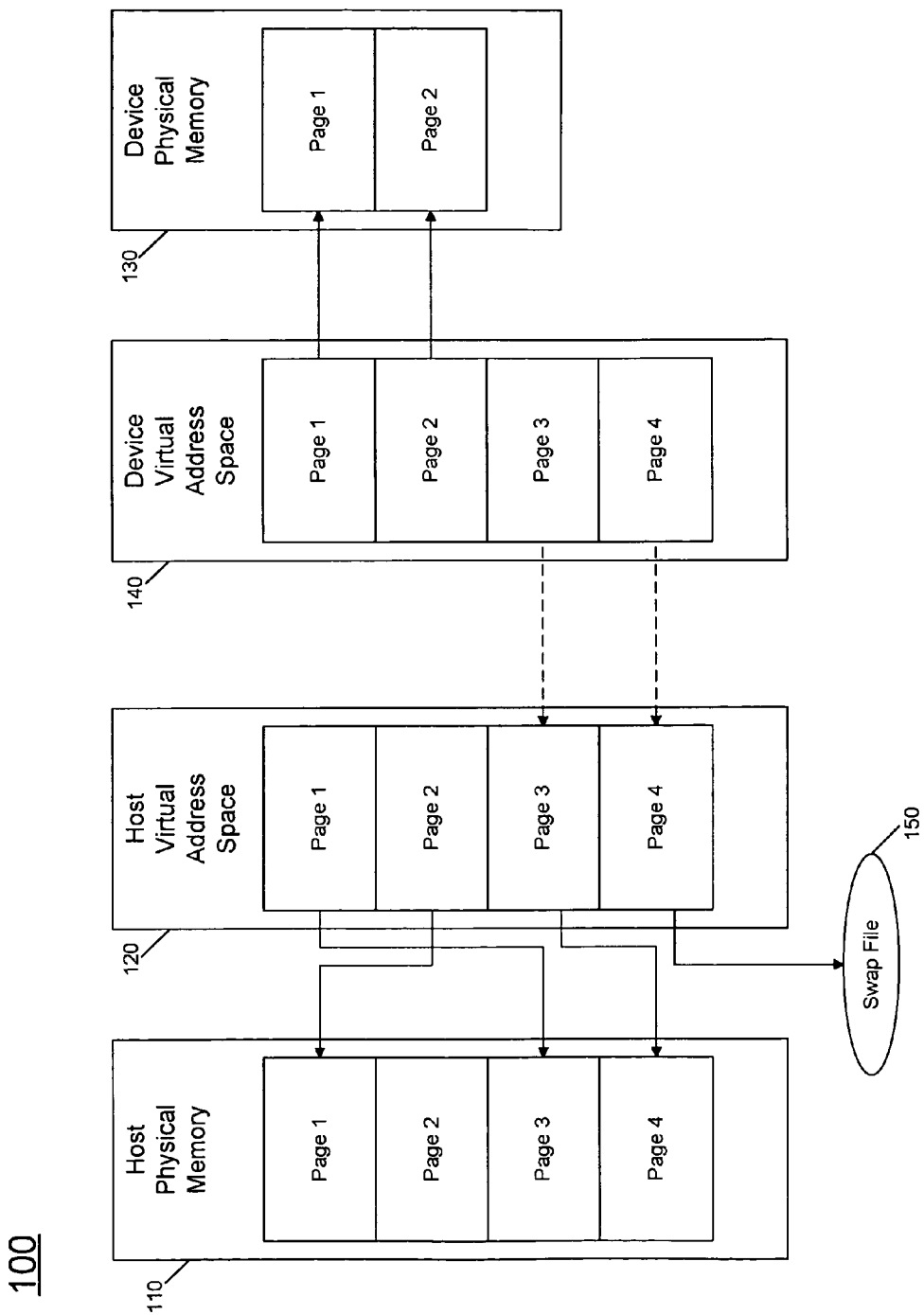
FIG. 2 is an asymmetric shared virtual memory (A-SVM) memory model in accordance with one embodiment of the present invention.

Referring now to FIG. 2, shown is an A-SVM memory model in accordance with one embodiment of the present invention. As shown in FIG. 2, model 100 provides for separate physical memories in the host and device, along with separately maintained host tables that shares virtual memory between host and device.

Specifically, as seen in FIG. 2, host memory 100 may be accessed using a host page table 120 which includes various entries that provide VA to PA translations for locations in the host memory. Of course, each entry in host page table 120 may include additional information such as status bits and so forth. Similarly, device memory 130 may be accessed using a device page table 140 which includes various entries that provide VA to PA translations for locations in the device memory. Similarly, each entry in device page table 140 may include additional information. These page tables may be implemented by way of a translation lookaside buffer (TLB) or another such memory structure which may be present within the given processor or another part of the corresponding host or device. Still further, the memory model may further include a swap file 150, which may be a mass storage device such as a disk drive or other non-volatile storage.

Thus assume that a user application has two parts: one part (a "master") is executed on the host (CPU) and another part (a "kernel") is off-loaded onto the device. From the programmer's point of view, both host and device parts of the application work in the same virtual memory space. In other words, a host and device share a common virtual memory space. There are thus two virtual page tables, namely the host page table (managed by the host OS) that maps virtual address to physical address in host memory, and the device page table (managed by the device uOS) maps virtual address to physical address in device memory. Note that these virtual addresses in the host and device are the same, only they map to different physical memory (either the host physical memory or the device physical memory).

With specific regard to be example shown in FIG. 2, virtual addresses corresponding to pages 1 and 2 of the page tables are presumably read only pages, as these pages are present in both host physical memory 110 and device physical memory 130. Because of the limited the size of device physical memory 130, note that the virtual addresses in device page table 140 corresponding to pages 3 and 4 are not present within device physical memory 130. Thus to access these pages, a page fault mechanism, as described further below may be used. With regard to the page 3 for which the corresponding physical memory is not present in device physical memory 130, a page fault operation may be performed to access the corresponding page 3 in host virtual page table 120, which in turn provides a physical address that points to page 4 of host physical memory 110, which may thus be transferred to a selected portion of device physical memory 130 (assuming that pages 1 and 2 of device physical memory 130 include read only data, the least recently accessed page may be overwritten with this incoming data). Instead, with regard to missing physical memory corresponding to virtual page 4 of device page table 140, a page miss operation leads to an access of page 4 of host virtual page table 120, which in turn indicates that the corresponding physical memory is not present at host physical memory 110, and instead an access to mass storage 150 may be made.

FIG. 2 further illustrates the asymmetric nature of the shared virtual memory. In this regard, note that the page fault occurring on the device needs the help of the host to be resolved. In contrast, on a page protection fault occurring on the host, there is no need to implicate the device in resolving the page fault: the host can handle such page faults on its own. Thus the device memory works as a "mega-cache" of host memory with a page as a basic swap unit. This memory constitutes a mega-cache, as instead of typical cache line accesses, transfers to and from this memory may be on a page-basis. Furthermore, embodiments may use direct memory access (DMA) operations to transfer data with this memory. The load of pages from host memory to device memory is done dynamically.

Figure 3:
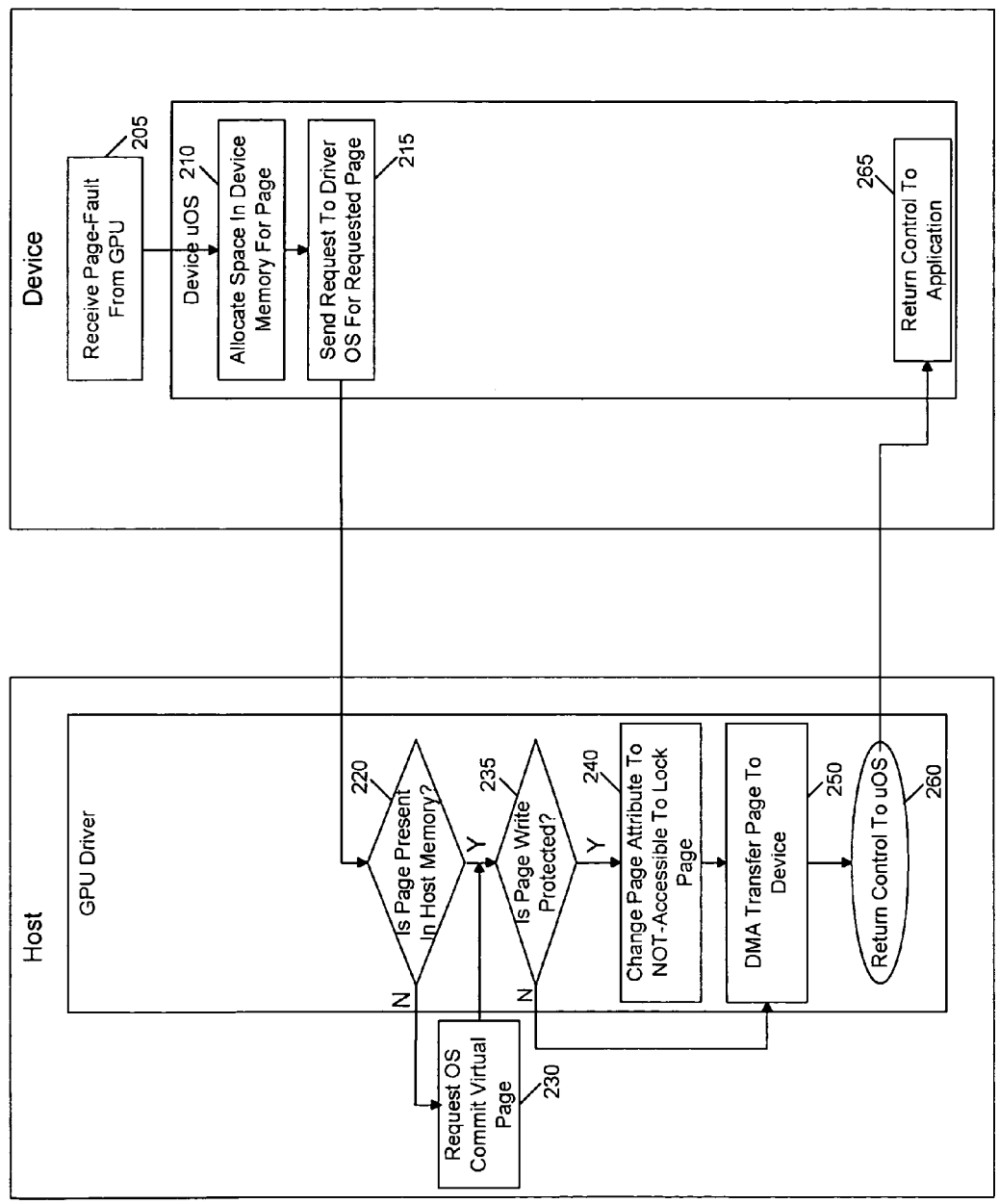
FIG. 3 is a flow diagram for handling a page miss on a device in accordance with one embodiment of the present invention.

Referring now to FIG. 3, shown is a flow diagram of handling a page miss on a device in accordance with one embodiment of the present invention. As shown in FIG. 3, method 200 may begin by receiving a page fault from a GPU (block 205). Such page fault may be received in a device micro-OS (uOS) that runs on the device and starts initiation of a miss handler or other code of the uOS. Upon receipt of the page fault, the uOS allocates space in the device memory for a page (block 210) (and swaps an old page to host memory, if needed). In one embodiment, if device memory is full, an old page, e.g., determined according to a least recently used (LRU) algorithm, may be identified and committed to host memory via a background operation. Next, a request is sent to a device driver of the OS to bring the missing virtual page from the host (block 215). In one embodiment, the request may include a processor identifier (PID) of the GPU, along with the requested virtual address and the corresponding physical address. In turn, control may pass to a GPU driver of the OS which determines whether the corresponding physical page is present in host memory (diamond 220). If the page is not present in the host memory, the host brings it from the disk. More specifically, the host OS may request a commit virtual page operation to obtain the page from memory (block 230). Note that in some implementations this commit operation may not actually store the received data from disk into the host memory, as instead it is destined for use on the device memory. Thus, the page can be sent out to the device without storage in the host memory, although in other embodiments the page can also be stored in the host memory.

From both of diamond 220 (if the page is present in host memory) and from block 230 control passes to diamond 235, where it may be determined whether the page attribute for the corresponding page allows write access (diamond 235). This may be determined by reference to, e.g., a write attribute bit associated with the page. Furthermore, note that if the page is present in host memory and is indicated to include stale data (e.g., a dirty attribute bit is set for the page), the host OS first updates the page content from a host cache, e.g., a CPU cache. If the page has a "WRITE" attribute set, control passes to block 240, where the host OS marks the page as "NOT PRESENT," thus locking the page to prevent host access to the page. Then, if host tries to access this page, different actions are possible. For example, the host processor may enter a WAIT state; the OS requires the GPU to return the page; or the host OS notifies the application when the page is available. Note that this coherency technique thus implicitly maintains coherency without requiring user-level (i.e., programmer) support. Then the page may be transferred to the device (e.g., via a direct memory access (DMA) mechanism) using the physical address received with the page request (block 250). After the DMA transfer is completed, control may be returned to the uOS (block 260) and from there control is returned to the application that caused the page fault (block 265). While shown with this particular implementation in the embodiment of FIG. 3, the scope of the present invention is not limited in this regard.

Thus in various embodiments, memory coherency between host and device may leverage an OS mechanism for memory sharing between processes. For example, if a page is "READ-ONLY", then host and device can both have a copy of the page in its memory that can be simultaneously accessed. If a page is "WRITE" enable, then the page could still be located in both subsystems, but only host code or device code can change it at any time. Thus a write protected page can be simultaneously stored and accessed in the host and device memories, while a writable page (that may be technically stored in both memories) can only be accessed in a single one of the memories at a given time. Ownership of a page can be transferred between host and device dynamically as shown above. When ownership of the page is transferred, its attribute is changed to "NOT_PRESENT". When a corresponding part of an application seeks to obtain data from this page, it will incur a page-fault exception, and software will handle transfer of page ownership. A device can use this virtual memory mechanism also for page swapping between device memory and host memory using host memory as a swap file for pages located in device memory. In this way, graphics devices can interact with different physical memory.

Figure 4:
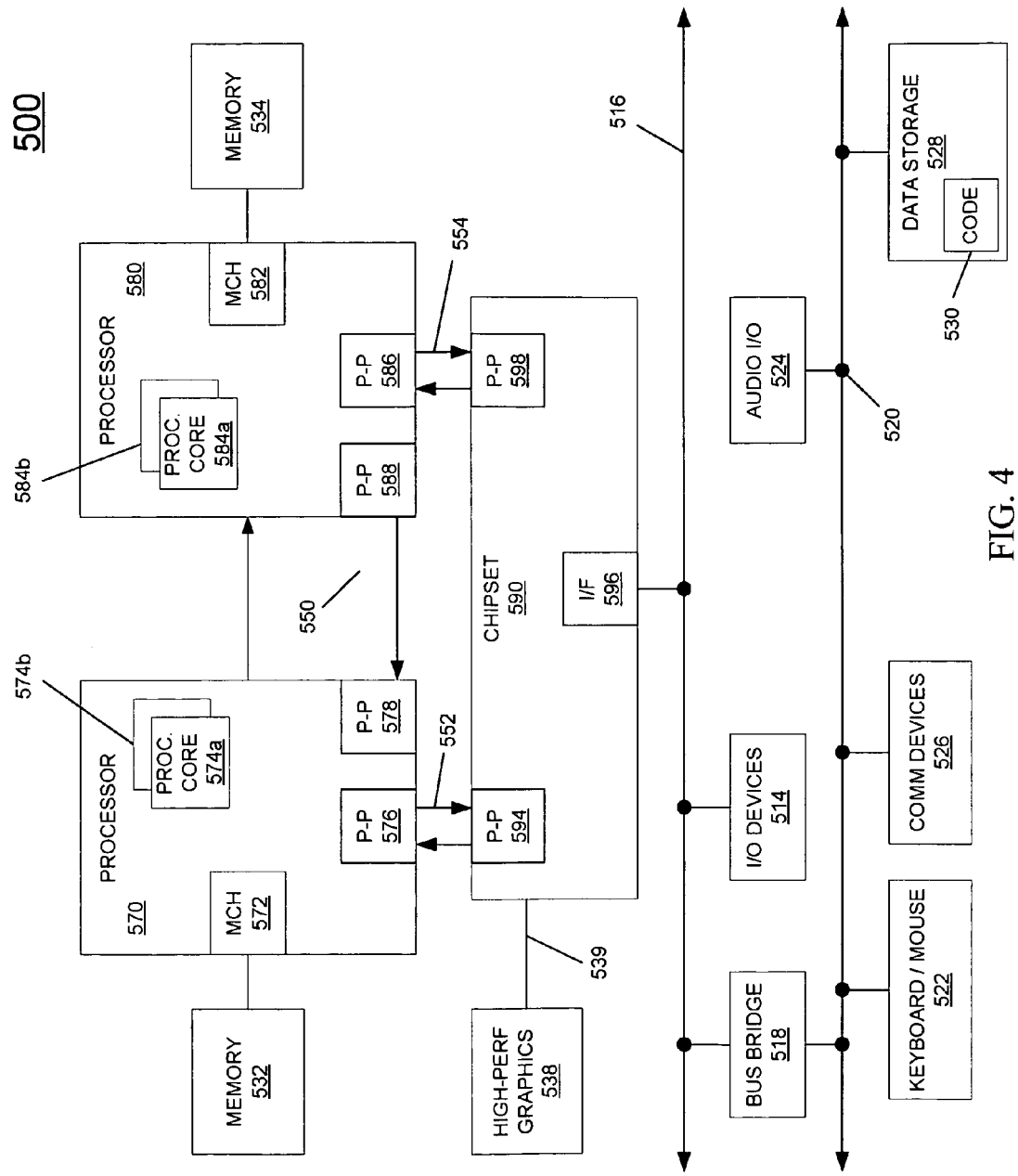
FIG. 4 is a block diagram of a system in accordance with an embodiment of the present invention.

Embodiments may be implemented in many different system types. Referring now to FIG. 4, shown is a block diagram of a system in accordance with an embodiment of the present invention. As shown in FIG. 4, multiprocessor system 500 is a point-to-point interconnect system, and includes a first processor 570 and a second processor 580 coupled via a point-to-point interconnect 550. As shown in FIG. 4, each of processors 570 and 580 may be multicore processors, including first and second processor cores (i.e., processor cores 574a and 574b and processor cores 584a and 584b).

Still referring to FIG. 4, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 4, MCH's 572 and 582 couple the processors to respective memories, namely a memory 532 and a memory 534, which may be portions of main memory (e.g., a dynamic random access memory (DRAM)) locally attached to the respective processors. First processor 570 and second processor 580 may be coupled to a chipset 590 via P-P interconnects 552 and 554, respectively. As shown in FIG. 4, chipset 590 includes P-P interfaces 594 and 598.

Furthermore, chipset 590 includes an interface 592 to couple chipset 590 with a high performance graphics engine 538, which may be associated with a device memory and which may asymmetrically share virtual memory with the main memory. In turn, chipset 590 may be coupled to a first bus 516 via an interface 596. As shown in FIG. 4, various I/O devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520.

Figure 5:
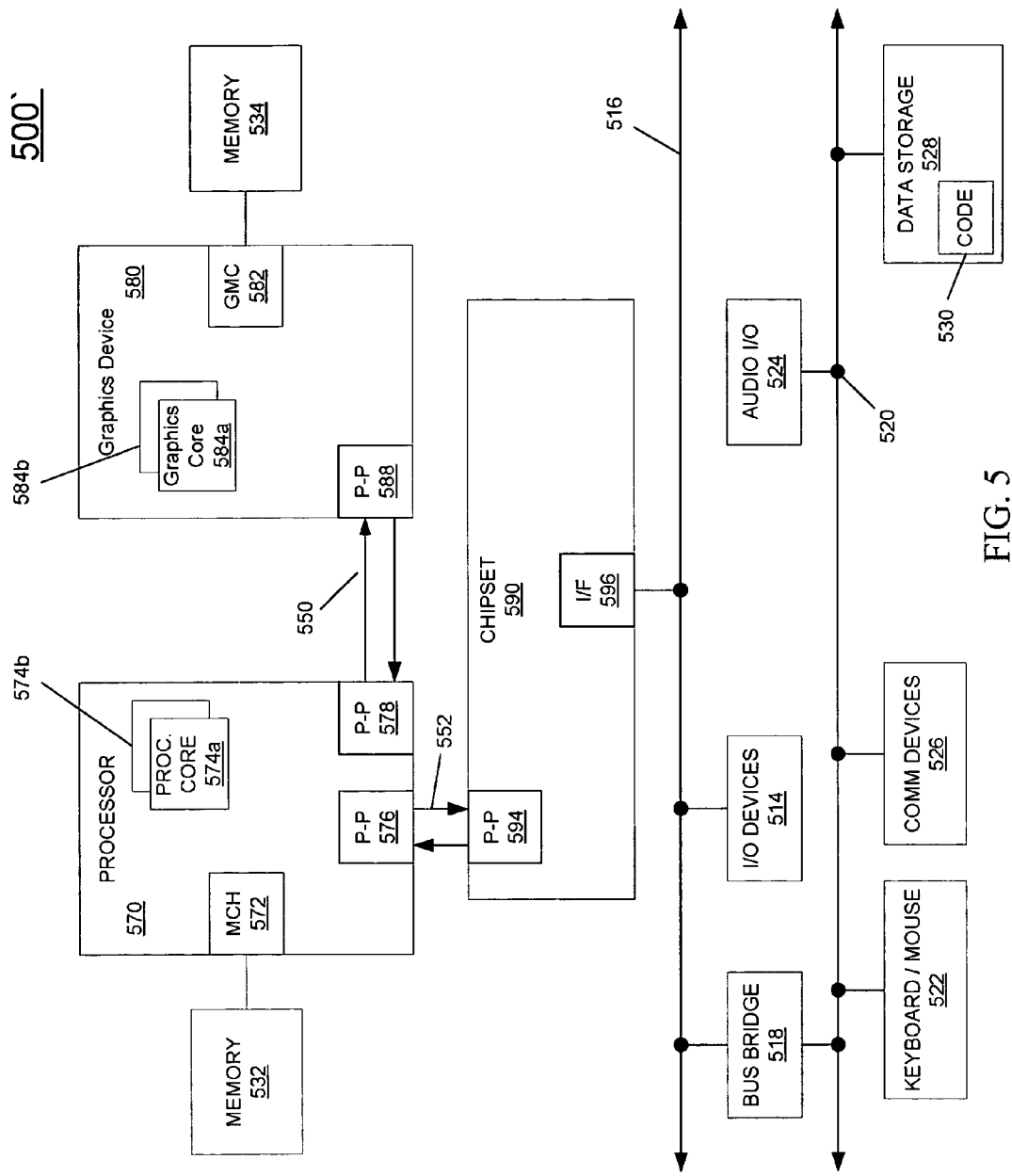
FIG. 5 is a block diagram of a system in accordance with another embodiment of the present invention.

In other embodiments, a specialized processor such as a graphics processor may be directly coupled to a general processor, e.g., via a P-P interconnect. Referring now to FIG. 5, shown is a block diagram of a system in accordance with another embodiment of the present invention. As shown in FIG. 5, system 500' may be generally arranged similarly to that of FIG. 4. However in the embodiment of FIG. 5, a graphics device 580 is coupled to processor 570 via an interconnect 550. As seen, graphics device 580 may include one or more graphics cores 584. In addition, graphics device 580 may include a graphics memory controller 582 that in turn is coupled to a graphics memory 534, which may be a part of graphics device 580 or a separately configured memory. By providing a direct connection between graphics device 580 and processor 570, more efficient flow of data may occur. Of course still other implementations are possible. For example, while graphics device 584 is shown as not being directly coupled to chipset 590, in other implementations a direct point-to-point interconnect may couple graphics device 580 and chipset 590. Furthermore, while described in the embodiment of FIG. 5 as being a graphics device, other specialized devices may similarly be connected directly to processor 570.

Embodiments may be implemented in code and may be stored on a storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a device having a device processor and a device memory, the device to couple to a host having a host processor and a host memory, the host having a host page table to map first virtual addresses to physical addresses of the host memory, the device having a device page table to map second virtual addresses to physical addresses of the device memory, wherein on a page fault in the device, the device is to request a missing page from the host memory via the host page table and the host memory and the device memory appear to a user-level application as a single virtual memory space.

2. The apparatus of claim 1, wherein the device memory is to act as a page-based cache memory of the host memory.

3. The apparatus of claim 2, wherein coherency between the device memory and the host memory is maintained implicitly without programmer interaction.

4. The apparatus of claim 3, wherein a write protected page can be stored simultaneously in the host memory and the device memory.

5. The apparatus of claim 1, wherein the host is to provide the missing page from the host memory to the device if present therein, and to set a not present indicator in the host memory for the corresponding page if the missing page is write enabled, wherein when the not present indicator is set, the host is prevented from accessing the corresponding page in the host memory.

6. The apparatus of claim 1, wherein the host is to provide the missing page from a mass storage coupled to the host to the device if the missing page is not present in the host memory, wherein the host is to provide the missing page directly to the device from the mass storage without storage in the host memory.

7. The apparatus of claim 1, wherein the device and the host are formed on a single integrated circuit, the host processor comprises a general-purpose processor and the device processor comprises a graphics processor.

8. A method comprising:
receiving a page fault from a device processor of a device including the device processor and a device memory, the device coupled to a host including a host processor, a host memory, and a host page table that is to map a virtual address to a physical address of the host memory in response to a request initiated by the host processor, the device and the host asymmetrically sharing a virtual memory space;

sending a request from the device to the host for a page associated with the page fault; and receiving the page by the device from the host, wherein the page is retrieved from storage by the host via the host page table, and wherein the page is locked in the host memory if the page is indicated to be write permissible.

9. The method of claim 8, further comprising allocating space in the device memory for the page before sending the request for the page to the host.

10. The method of claim 8, further comprising mapping the device memory using a device page table including a plurality of device entries, each device entry associating a corresponding virtual address to a corresponding physical address of the device memory, the virtual addresses symmetric to host virtual addresses of host entries of a host page table of the host, each host virtual address mapped to a corresponding physical address of the host memory.

11. The method of claim 10, further comprising maintaining coherency between the host memory and the device memory by indicating that a corresponding page of the host memory is inaccessible when the page is sent to the device and the page is writable.

12. The method of claim 8, further comprising using the host to handle the page fault occurring on the device, and not using the device to handle a page fault occurring on the host.

13. A system comprising:

a processor having a translation lookaside buffer (TLB) to store first virtual address to physical address translations for a memory;

the memory coupled to the processor to store a first plurality of pages each corresponding to one of the physical addresses;

a graphics processor coupled to the processor via an interconnect and including a graphics translation lookaside buffer (gTLB) to store second virtual address to physical address translations for a graphics memory; and the graphics memory coupled to the graphics processor to store a second plurality of pages each corresponding to one of the physical addresses of the gTLB, wherein the TLB and the gTLB asymmetrically share virtual addresses of a single virtual address space;

wherein in response to a page fault associated with a first request to the graphics memory for a page, the graphics processor is to transmit a second request for the page to the processor and the processor is to provide the page to the graphics processor using the TLB.

14. The system of claim 13, wherein the graphics memory comprises a cache for the memory.

15. The system of claim 14, wherein the processor is to provide the page from the memory to the graphics memory via a direct memory access operation if the page is present in the memory.

16. The system of claim 13, wherein an application is to execute on the processor and the graphics processor using the single virtual address space.

17. The system of claim 16, wherein the application includes a first portion to operate on the processor using the memory and a second portion to operate on the graphics processor using the graphics memory.

18. The system of claim 13, wherein the processor is to obtain the page from a mass storage device coupled to the processor if the missing page is not present in the memory, wherein the processor is to provide the page directly from the mass storage device to the graphics memory without first storing the page in the memory.

19. The system of claim 13, wherein a write protected page can be simultaneously stored and accessed in the memory and the graphics memory, and a writable page can only be accessed in a single one of the memory and the graphics memory at a time.

* * * * *